United States Patent
Yacoub

(10) Patent No.: US 9,255,508 B2
(45) Date of Patent: *Feb. 9, 2016

(54) INTERNAL COMBUSTION ENGINE WITH EXHAUST-GAS AFTERTREATMENT ARRANGEMENT AND METHOD FOR OPERATING AN INTERNAL COMBUSTION ENGINE OF SAID TYPE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,131

(22) Filed: Feb. 11, 2014

(65) Prior Publication Data

US 2014/0230433 A1    Aug. 21, 2014

(30) Foreign Application Priority Data

Feb. 15, 2013    (DE) .......................... 10 2013 202 496

(51) Int. Cl.
| | |
|---|---|
| *F01N 3/00* | (2006.01) |
| *F01N 3/20* | (2006.01) |
| *F01N 3/30* | (2006.01) |
| *F01N 3/22* | (2006.01) |

(Continued)

(52) U.S. Cl.
CPC .............. *F01N 3/2006* (2013.01); *F01N 3/035* (2013.01); *F01N 3/106* (2013.01); *F01N 3/2053* (2013.01); *F01N 3/2066* (2013.01); *F01N 3/22* (2013.01); *F01N 3/30* (2013.01); *F01N 13/009* (2014.06); *F01N 13/0097* (2014.06); *F02B 37/127* (2013.01); *F02B 37/168* (2013.01); *F01N 3/208* (2013.01); *F01N 2240/20* (2013.01); *F01N 2240/36* (2013.01); *F01N 2610/02* (2013.01);

(Continued)

(58) Field of Classification Search
CPC ..... F01N 3/106; F01N 3/2006; F01N 3/2053; F01N 3/30; F01N 3/2066; F01N 3/035; F01N 13/0097; F01N 13/009; F02B 37/127; F02B 37/168
USPC .......................................................... 60/295
See application file for complete search history.

(56) References Cited

U.S. PATENT DOCUMENTS

| | | |
|---|---|---|
| 6,167,698 B1 | 1/2001 | King et al. |
| 2004/0093855 A1 | 5/2004 | Monro, Jr. |

(Continued)

FOREIGN PATENT DOCUMENTS

| | | |
|---|---|---|
| DE | 102004036036 A1 | 3/2006 |
| DE | 102007061005 A1 | 6/2009 |
| DE | 102011005654 A1 | 9/2012 |

OTHER PUBLICATIONS

Yacoub, Yasser M., "Internal Combustion Engine With Exhaust-Gas Aftertreatment Arrangement and Intake Air Arrangement and Method for Operating an Internal Combustion Engine of Said Type," U.S. Appl. No. 14/178,149, filed Feb. 11, 2014, 51 pages.

*Primary Examiner* — Jason Shanske
(74) *Attorney, Agent, or Firm* — Julia Voutyras; Alleman Hall McCoy Russell & Tuttle LLP

(57) ABSTRACT

A system and method for controlling temperature of a urea reductant to form ammonia for NOx reduction in a selective catalytic reducer coupled to a turbocharged engine exhaust by portioning a flow across the reductant between compressed air and ambient air.

19 Claims, 9 Drawing Sheets

(51) Int. Cl.
  *F01N 3/10* (2006.01)
  *F02B 37/12* (2006.01)
  *F02B 37/16* (2006.01)
  *F01N 3/035* (2006.01)
  *F01N 13/00* (2010.01)
  *F02B 37/18* (2006.01)

(52) U.S. Cl.
  CPC ....... *F01N 2610/08* (2013.01); *F01N 2610/085* (2013.01); *F01N 2610/1453* (2013.01); *F01N 2900/1811* (2013.01); *F02B 37/18* (2013.01); *F02B 37/183* (2013.01); *Y02T 10/144* (2013.01); *Y02T 10/24* (2013.01); *Y02T 10/26* (2013.01)

(56) References Cited

U.S. PATENT DOCUMENTS

| | | | |
|---|---|---|---|
| 2007/0036694 A1* | 2/2007 | Nishioka et al. | 422/168 |
| 2007/0251218 A1* | 11/2007 | Driscoll et al. | 60/286 |
| 2009/0056311 A1 | 3/2009 | Crosby et al. | |
| 2009/0145117 A1* | 6/2009 | Doring et al. | 60/286 |
| 2010/0122525 A1* | 5/2010 | Fujita et al. | 60/285 |
| 2010/0154412 A1* | 6/2010 | Andreae et al. | 60/600 |
| 2011/0036076 A1* | 2/2011 | Gonze et al. | 60/286 |
| 2011/0072796 A1* | 3/2011 | Van Nieuwstadt | 60/285 |
| 2011/0072797 A1* | 3/2011 | Van Nieuwstadt | 60/285 |
| 2011/0146268 A1* | 6/2011 | Hepburn et al. | 60/602 |

* cited by examiner

INTERNAL COMBUSTION ENGINE WITH EXHAUST-GAS AFTERTREATMENT ARRANGEMENT AND METHOD FOR OPERATING AN INTERNAL COMBUSTION ENGINE OF SAID TYPE

CROSS REFERENCE TO RELATED APPLICATIONS

The present application claims priority to German Patent Application No. 102013202496.7, filed on Feb. 15, 2013, the entire contents of which are hereby incorporated by reference for all purposes.

BACKGROUND

Summary

An internal combustion engine with an exhaust gas aftertreatment system comprising a selective catalytic reducer (SCR) catalyst is commonly used to treat NOx emissions. A reductant, often aqueous urea, is injected via a dosing device in the exhaust line upstream of the SCR catalyst. The NOx reacts with the reductant to form byproducts such as water and nitrogen.

One example approach positions the dosing device upstream of the SCR catalyst in an exhaust bypass line. A control valve is positioned in the exhaust bypass line to control the volume flow of exhaust through the bypass line to control the temperature of the hydrolysis catalyst. Another example approach is to use HC enrichment by introducing unburned hydrocarbons directly into the exhaust-gas discharge system to act as the reductant by means of post-injection of additional fuel into a combustion chamber.

A potential issue noted by the inventors with the use of a control valve in the exhaust bypass line is the relative complexity of the system and the temperature control and selected mass flow limitations of using a valve positioned in the exhaust bypass line. Further, there may be operating conditions under which reductant may not be delivered to the SCR catalyst and allow the release of NOx. Another potential issue noted by the inventors is with HC enrichment which utilizes post-injection. The internal combustion engine may be susceptible to thinning or contamination of the oil with unburned hydrocarbons. Further, additional fuel is used as the reducing agent thereby increasing overall fuel consumption.

One potential approach to at least partially address some of the above issues includes an internal combustion engine comprising an intake system for the supply of charge air and an exhaust gas discharge system for the discharge of the exhaust gases. Further at least one selective catalytic converter is arranged in the exhaust gas discharge system for the reduction of nitrogen oxides wherein an oxidation catalytic converter being arranged as a further exhaust gas after-treatment system upstream of the at least one selective catalytic converter. A bypass line branching off from the intake system and issuing into the exhaust gas discharge system between the oxidation catalytic converter and the at least one selective catalytic converter further comprising a dosing device being provided for introducing liquid urea as a reducing agent for the at least one selective catalytic converter into the bypass line.

Another potential approach to at least partially address some of the above issues includes a method for operating an internal combustion engine having a control element for the adjustment of the air flow rate conducted through the bypass line wherein the bypass line is opened in order to supply ammonia as the reducing agent to the at least one selective catalytic converter.

Another potential approach includes a method for controlling an engine with a selective catalytic reducer coupled to the engine exhaust comprising supplying compressed air to the engine to achieve a selected torque and injecting a reductant into the SCR. The temperature of the reductant may be controlled within a predetermined range by portioning an air flow into said reductant between a portion of said compressed air and ambient air. Further, the engine torque may be adjusted to compensate for said portioning of said compressed air.

Another potential approach further includes a method for maintaining temperature of the dosing device within a selected range, while maintaining emissions control and operating the engine at a selected power output. The method comprises supplying compressed air to the engine to achieve a selected torque, injecting a reductant into the selective catalytic converter, and controlling temperature of the reductant within a predetermined range by portioning an air flow into the reductant between a portion of the compressed air and ambient air. The method may further adjust engine torque to compensate for the portioning of the compressed air. The compressed air may be supplied from a compressor driven by a turbine positioned in the engine exhaust discharge system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
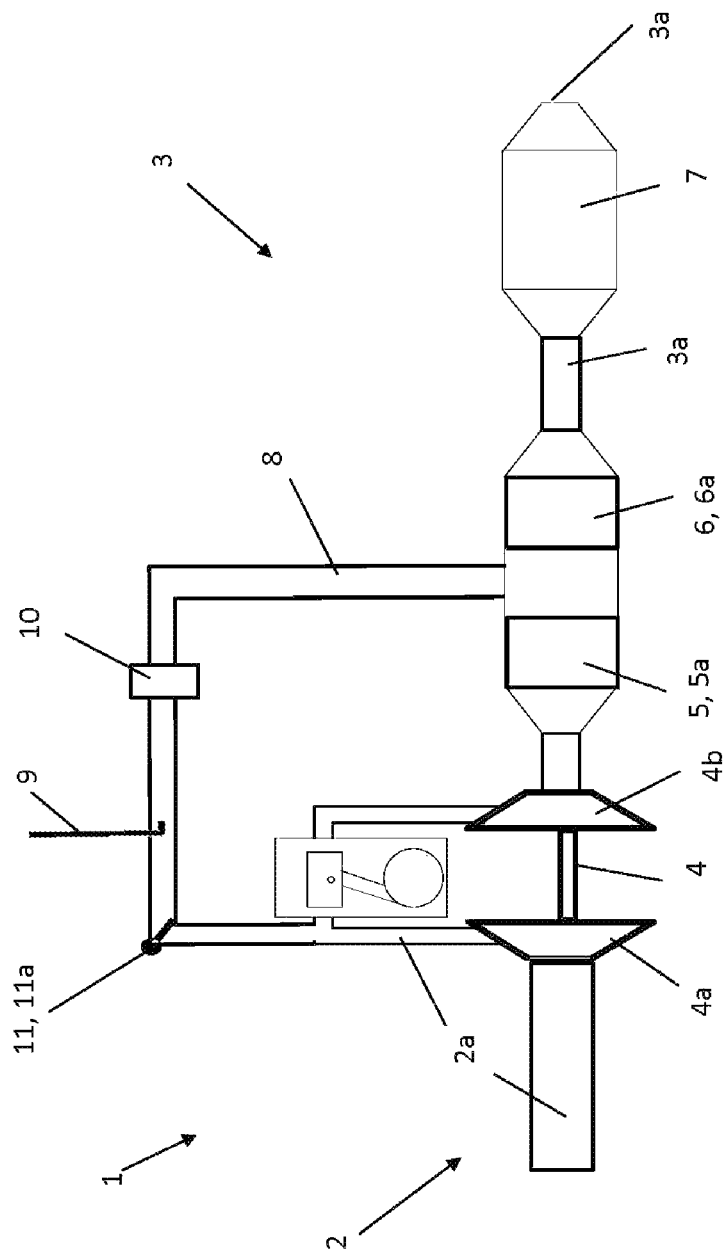
FIG. 1 schematically shows, in the form of a diagrammatic sketch, a first embodiment of the internal combustion engine.

The present application relates to an internal combustion engine which has an intake system for the supply of charge air and has an exhaust-gas discharge system for the discharge of the exhaust gases and has at least one selective catalytic converter which is arranged in the exhaust-gas discharge system and which serves for the reduction of nitrogen oxides, an oxidation catalytic converter being arranged, as a further exhaust-gas aftertreatment system, in the exhaust-gas discharge system upstream of the at least one selective catalytic converter.

The present application also relates to a method for operating an internal combustion engine of the above-stated type. An internal combustion engine is used for example as a drive of a motor vehicle. Within the context of the present application, the expression "internal combustion engine" encompasses diesel engines and applied-ignition engines and also hybrid internal combustion engines, which utilize a hybrid combustion process, and hybrid drives which comprise not only the internal combustion engine but also an electric machine which is connected in terms of drive to the internal combustion engine and which receives power from the internal combustion engine or which, as a switchable auxiliary drive, outputs additional power.

According to the prior art, to reduce the pollutant emissions, internal combustion engines may be equipped with various exhaust-gas aftertreatment systems.

In applied-ignition engines, use is made of catalytic reactors which, through the use of catalytic materials which increase the rate of certain reactions, better enable an oxidation of HC and CO even at low temperatures. To additionally reduce nitrogen oxides NOx, this may be achieved through the use of a three-way catalytic converter, stoichiometric operation ($\lambda \approx 1$) of the applied-ignition engine within a narrow threshold. Here, the nitrogen oxides $NO_x$ may be reduced by means of the non-oxidized exhaust-gas components which may be present, specifically the carbon monoxides CO and the unburned hydrocarbons HC, wherein said exhaust-gas components may be oxidized at the same time.

In internal combustion engines which may be operated with an excess of air, for example direct-injection diesel engines or lean-burn applied-ignition engines, the nitrogen oxides $NO_x$ in the exhaust gas cannot be reduced out of principle, that is to say on account of the lack of reducing agent.

For this reason, it is necessary to provide an exhaust-gas aftertreatment system for the reduction of the nitrogen oxides, for example a selective catalytic converter, also referred to as SCR catalytic converter, in which reducing agent is introduced into the exhaust gas in a targeted manner in order to selectively reduce the nitrogen oxides. As reducing agent, in addition to ammonia $NH_3$ and urea, use may also be made of unburned hydrocarbons. The latter is also referred to as HC enrichment, with the unburned hydrocarbons being introduced directly into the exhaust-gas discharge system or else by means of engine-internal measures, for example by means of a post-injection of additional fuel into the combustion chamber. Here, the post-injected fuel should not be ignited in the combustion chamber by the main combustion which is still taking place or by the—even after the end of the main combustion—high combustion gas temperatures, but rather should be introduced into the exhaust-gas discharge system upstream of the selective catalytic converter during the charge exchange.

Internal combustion engines which utilize post-injection may be inherently susceptible to thinning or contamination of the oil with unburned hydrocarbons. Depending on the post-injected fuel quantity and the injection time, a greater or lesser fraction of the post-injected fuel impinges on the cylinder internal wall, mixes there with the adherent oil film, and thus contributes to the thinning of the oil. Furthermore, out of principle, the use of additional fuel as reducing agent increases the overall fuel consumption of the internal combustion engine.

Therefore, for the reduction of nitrogen oxides, use is increasingly being made of selective catalytic converters in which ammonia or urea is provided as reducing agent.

Owing to the toxicity of ammonia $NH_3$, ammonia is generally not stored in motor vehicles, or provided as reducing agent, in pure form. Rather, urea is often used as a precursor product for the production of ammonia, because urea can, with a supply of energy, be split into ammonia and isocyanic acid in a thermolytic reaction, wherein ammonia $NH_3$ can be obtained again from the isocyanic acid in the presence of water.

In the case of urea being provided for producing ammonia, it is possible to make a distinction between two approaches which differ fundamentally from one another. On the one hand, the urea may be stored and provided in liquid form, which is to say as an aqueous solution, the urea being introduced as aqueous solution into the exhaust gas upstream of the selective catalytic converter. On the other hand, it is possible for the urea to be provided in solid form. Urea in solid form takes up less volume and is characterized by a higher ammonia content in relation to the aqueous solution. The storage vessel can therefore be formed with a smaller storage volume, which is a significant advantage in particular with regard to use in motor vehicles, in which it is sought to achieve the densest and most effective packaging possible.

Both concepts introduce heat into the urea in order to produce ammonia. This may pose potential issues in certain operating modes. For example, if an aqueous urea solution is introduced into the exhaust gas upstream of a selective catalytic converter, exhaust-gas temperatures of approximately 150° C. to 170° C. may be necessary to evaporate the urea solution, produce ammonia $NH_3$ and adequately mix said ammonia, which serves as reducing agent, with the exhaust gas such that as homogeneous as possible an exhaust-gas/ammonia mixture is formed and flows through the catalytic converter.

In the case of diesel engines, in inner-city traffic, difficulties can be encountered in generating or attaining exhaust-gas temperatures of the above-mentioned magnitude. It must be considered here that, normally, exhaust-gas temperatures of only 100° C. may be attained at idle, and internal combustion engines require a certain warm-up phase after a cold start in order for the individual exhaust-gas aftertreatment systems to reach their operating temperature and convert pollutants.

Selective catalytic converters can not only reduce nitrogen oxides in the presence of a reducing agent, for example ammonia, but in the presence of suitable temperatures can also absorb and store ammonia and release said ammonia again for the reduction of nitrogen oxides. To be able to absorb ammonia, certain minimum temperatures of the catalytic converter may be considered. In general, catalytic converter temperatures of between 180° C. and 300° C. may be sought in order to better enable satisfactory exhaust-gas aftertreatment by means of an SCR catalytic converter.

The statements made above give the impression that it is advantageous for selective catalytic converters to be arranged as close as possible to the outlet of the internal combustion engine, that is to say in a close-coupled position, in order that the exhaust gases may be given little time and opportunity to cool down and in order to better enable that the catalytic converter reaches its operating temperature as quickly as possible, in particular after a cold start of the internal combustion engine.

Here, however, it must be borne in mind that an internal combustion engine generally has further exhaust-gas aftertreatment systems, the close-coupled arrangement of which may be of even greater relevance. For example, an oxidation catalytic converter is commonly arranged as a first exhaust-gas aftertreatment system in the exhaust-gas discharge system, which oxidation catalytic converter serves to oxidize the incompletely burned combustion products, specifically the carbon monoxides CO and the unburned hydrocarbons HC. Here, a close-coupled arrangement of the oxidation catalytic converter is essential in order that, in particular, the untreated emissions of carbon monoxide and unburned hydrocarbons, which may be high after a cold start, may be lowered in an effective manner and fast heating of the oxidation catalytic converter after a cold start is better enabled.

If a regenerative particle filter is used for the reduction of the soot particle emissions, high temperatures of approximately 550° C. may be considered for the regeneration of the particle filter if catalytic assistance is not provided, such high temperatures being attained during operation only at high loads and at high engine speeds. As close-coupled an arrangement as possible is thus also expedient with regard to a particle filter.

It must also be considered that a selective catalytic converter releases absorbed ammonia at very high catalytic converter temperatures above approximately 400° C., without nitrogen oxides being reduced. Both the released ammonia and also the untreated, nitrogen-oxide-containing exhaust gas may be then discharged via the exhaust-gas discharge system into the environment.

Even though the present regulations do not imperatively require on-board diagnosis (OBD), future limit values for nitrogen oxide emissions prescribed by legislators could make this necessary. For example, the EURO VI regulation prescribes the monitoring of nitrogen oxide untreated emissions. In particular, on-board diagnosis (OBD), specifically the monitoring of the ammonia concentration in the aftertreated exhaust gas, could become essential for reliably reducing ammonia from being introduced into the environment.

The technical relationships described above make it clear that concepts may be considered which enable selective catalytic converters to be operated in optimum fashion with regard to the most effective possible exhaust-gas aftertreatment of an internal combustion engine. Such concepts should in particular be able to influence the exhaust-gas temperature of the exhaust gas to be treated, and thus the temperature of the catalytic converter, in order to better enable high-quality exhaust-gas aftertreatment, that is to say an effective reduction of nitrogen oxides.

Against the background of that stated above, it is an object of the present application to provide an internal combustion engine which is optimized with regard to the operation of the at least one selective catalytic converter.

It is a further sub-object of the present application to specify a method for operating an internal combustion engine of said type.

The first sub-object is achieved by means of an internal combustion engine which has an intake system for the supply of charge air and has an exhaust-gas discharge system for the discharge of the exhaust gases and has at least one selective catalytic converter which is arranged in the exhaust-gas discharge system and which serves for the reduction of nitrogen oxides, an oxidation catalytic converter being arranged, as a further exhaust-gas aftertreatment system, in the exhaust-gas discharge system upstream of the at least one selective catalytic converter, wherein a bypass line branches off from the intake system and issues into the exhaust-gas discharge system between the oxidation catalytic converter and the at least one selective catalytic converter, a dosing device being provided for introducing liquid urea as a reducing agent for the at least one selective catalytic converter into the bypass line.

In the case of the internal combustion engine, it is possible for the selective catalytic converter to be impinged on directly with a carrier gas stream for the reducing agent, specifically an air stream, while further exhaust-gas aftertreatment systems situated upstream of the catalytic converter may be bypassed. Here air may be conducted directly to the selective catalytic converter, past the further exhaust-gas aftertreatment systems, via a bypass line.

By means of said measure, the opening of the bypass line for the passage of air, that part of the exhaust-gas discharge system which is situated between the outlet of the internal combustion engine, that is to say the outlet openings of the cylinders, and the selective catalytic converter is eliminated, specifically by virtue of said part being bypassed via the bypass line. This eliminates the cooling of the exhaust-gas stream, which is normally used as a carrier gas stream, which may occur owing to thermal inertia if said exhaust-gas stream were to flow through the exhaust-gas discharge system. The cooling of the carrier stream used that may occur in said part is eliminated likewise because the air stream used is first introduced into the exhaust-gas discharge system downstream of the further exhaust-gas aftertreatment systems and upstream of the at least one selective catalytic converter. This distinguishes the carrier air stream from a secondary air flow which, according to the prior art, is fed in directly downstream of the cylinder outlet openings.

In the case of an internal combustion engine supercharged by means of exhaust-gas turbocharging, in which the compressor of at least one exhaust-gas turbocharger is arranged in the intake system and the bypass line branches off from the intake system downstream of said compressor, the charge air conducted through the bypass line is heated or intensely warmed owing to compression, whereby the evaporation of the liquid urea and the preparation thereof to form ammonia as reducing agent for the at least one selective catalytic converter is assisted in an advantageous manner.

In this way, the temperature of the carrier stream and the temperature of the catalytic converter can be raised in a targeted manner, for example in inner-city traffic, if the relatively low exhaust-gas temperatures hinder effective exhaust-gas aftertreatment by means of the exhaust-gas stream as a carrier gas stream.

It is also possible, for example by means of a heating device provided in the bypass line, to realize temperatures of approximately 150° C. to 170° C. which may be considered to evaporate the urea solution, which is introduced in aqueous form into the air, and generate ammonia.

The fact that the dosing device for the introduction of the urea solution is provided in the bypass line also leads to advantages in terms of the structural design of the exhaust-gas discharge system, because the arrangement of the dosing device in the bypass line makes it possible for the selective catalytic converter, and possibly the further exhaust-gas aftertreatment systems, to be arranged in a close-coupled or more close-coupled manner.

If the exhaust-gas temperatures increase to a critical level owing to the present operation of the internal combustion engine, for example to such an extent that ammonia which is absorbed in the catalytic converter and which serves as reducing agent is released in uncontrolled fashion owing to an excessively high catalytic converter temperature and could pass via the exhaust-gas discharge system into the environment, the exhaust gas can be cooled by virtue of the bypass line being opened and air being admixed, whereby the exhaust gas temperature and the catalytic converter temperature may be lowered.

The first sub-object that is to say the provision of an internal combustion engine which is optimized with regard to the operation of the at least one selective catalytic converter, is achieved by means of the internal combustion engine.

For effective exhaust-gas aftertreatment, it is generally necessary for multiple exhaust-gas aftertreatment systems to be provided, for which reason an oxidation catalytic converter is provided for the aftertreatment of the carbon monoxides and the unburned hydrocarbons. Said at least one further exhaust-gas aftertreatment system is arranged in the exhaust-gas discharge system upstream of the at least one selective catalytic converter.

A close-coupled arrangement of the oxidation catalytic converter better enables fast heating of the oxidation catalytic converter, or basically that the operating temperature is attained and maintained. The oxidation processes that take place in the oxidation catalytic converter can be utilized to raise the exhaust-gas temperatures upstream of the at least one SCR catalytic converter.

Further advantageous embodiments of the internal combustion engine according to the subclaims will be explained below.

Embodiments of the internal combustion engine may be advantageous in which a mixer is provided in the bypass line downstream of the dosing device.

For effective exhaust-gas aftertreatment, the ammonia that is produced by means of aqueous urea solution and which serves as reducing agent should be adequately mixed with the carrier stream, that is to say the air. As homogeneous as possible an air-ammonia mixture should advantageously be formed and flow through the at least one selective catalytic converter.

Embodiments of the internal combustion engine may be also advantageous in which a heater is provided in the bypass line upstream of the dosing device.

By means of a heater, the temperatures of the air which serves as carrier gas can be raised, and thus the air temperatures for the evaporation of the aqueous urea solution can be generated. The heater advantageously comprises a heatable grate or mesh through which the air flows. The grate or mesh serves for heating the air and can simultaneously generate turbulence which assists the mixing of air and reducing agent downstream in the bypass line.

Embodiments of the internal combustion engine may be advantageous in which, upstream of the dosing device, there is provided a pump which draws in ambient air and delivers said ambient air into the bypass line. It must be considered here that charge air is extracted from the intake system via the bypass line, wherein the extracted charge air is, in effect, omitted from the charge exchange, that is to say can no longer form a part of the cylinder fresh charge or charge air to be provided by the intake system. This need not lead to potential issues; in particular need not lead to an impaired charge exchange or impaired efficiency, under operating circumstances. For example, in the case of an applied-ignition engine operated in the part-load range, it may readily be possible, by means of reduced throttling of the intake air, for the extracted charge air to be provided by excess intake air. However, if the same applied-ignition engine is operated at higher loads or at full load, that is to say is completely dethrottled or almost dethrottled, no excess air can be drawn in, and the air extracted from the intake system for the bypass line is in fact omitted from the charge exchange. It is then the intention for the pump to relieve the burden on the intake system by acting as an air delivery means for the bypass line, the pump then serving for feeding ambient air into the bypass line.

Said embodiment is suitable in particular for hybrid drives which comprise not only the internal combustion engine but also an electric machine which can be connected in terms of drive to the internal combustion engine and which receives power from the internal combustion engine or which, as a switchable auxiliary drive, additionally outputs power. An electrically operated pump may then be supplied with electrical current from the electric machine or from the associated battery.

Embodiments of the internal combustion engine may be advantageous in which, downstream of the dosing device, there is provided a catalytic converter for the catalytic assistance of the hydrolysis of isocyanic acid.

Whereas the urea solution is, with a supply of energy, split into ammonia ($NH_3$) and isocyanic acid (HNCO) in a thermolytic reaction, the isocyanic acid (HNCO) can be hydrolyzed in the presence of water ($H_2O$) to form ammonia ($NH_3$) and carbon dioxide ($CO_2$).

According to the present embodiment, a catalytic converter for the catalytic assistance of the hydrolysis of isocyanic acid is provided downstream of the dosing device.

Embodiments of the internal combustion engine may be advantageous in which the selective catalytic converter arranged downstream of the oxidation catalytic converter in the exhaust-gas discharge system is formed integrally with a particle filter as a combined exhaust-gas aftertreatment system.

Combined exhaust-gas aftertreatment systems have advantages with regard to the space requirement thereof. The selective catalytic converter and the particle filter may share a common carrier substrate. The oxidation catalytic converter is arranged upstream of and spaced apart from the combined exhaust-gas aftertreatment system. In this way, disadvantageous excessive heating of the selective catalytic converter owing to excessively high temperatures of the oxidation catalytic converter can be reduced.

Embodiments of the internal combustion engine may be also advantageous in which a particle filter as a further exhaust-gas aftertreatment system is arranged in the exhaust-gas discharge system upstream of the at least one selective catalytic converter, the oxidation catalytic converter being arranged upstream of the particle filter and the bypass line issuing into the exhaust-gas discharge system between the particle filter and the at least one selective catalytic converter.

Embodiments of the internal combustion engine may be advantageous in which a control element is provided by means of which the air flow rate conducted through the bypass line can be adjusted.

The control element may be a valve, a slide, a flap or the like. Said control element may be electrically, hydraulically, pneumatically, mechanically or magnetically actuable, optionally controlled by means of the engine controller, and may be designed to be switchable, that is to say adjustable, in two-stage, multi-stage or continuously variable fashion.

Embodiments of the internal combustion engine may be advantageous in which at least one exhaust-gas turbocharger is provided, the compressor of the at least one exhaust-gas turbocharger being arranged in the intake system, and the turbine of the at least one exhaust-gas turbocharger being arranged in the exhaust-gas discharge system.

The advantages of an exhaust-gas turbocharger for example in relation to a mechanical charger may be that no mechanical connection for transmitting power exists between the charger and internal combustion engine. While a mechanical supercharger draws the energy for driving it from the internal combustion engine, the exhaust-gas turbocharger utilizes the exhaust-gas energy of the hot exhaust gases.

The energy imparted to the turbine by the exhaust-gas flow is utilized for driving a compressor which delivers and compresses the charge air supplied to it, whereby supercharging of the cylinders is achieved. A charge-air cooling arrangement may be provided, by means of which the compressed combustion air is cooled before it enters the cylinders.

Supercharging serves primarily to increase the power of the internal combustion engine. Supercharging is however also a suitable means for shifting the load collective toward higher loads for the same vehicle boundary conditions, whereby the specific fuel consumption can be lowered.

A torque drop is often observed when a certain engine rotational speed is undershot. It is sought, using a variety of measures, to improve the torque characteristic of a supercharged internal combustion engine. This is achieved for example by means of a small design of the turbine cross section and simultaneous provision of an exhaust-gas blow-off facility. Such a turbine is also referred to as a wastegate turbine. If the exhaust-gas mass flow exceeds a critical value, then by opening a shut-off element, a part of the exhaust-gas flow is, within the course of the so-called exhaust-gas blow-off, conducted via a bypass line past the turbine or the turbine impeller.

The torque characteristic of a supercharged internal combustion engine may be furthermore be improved by means of multiple turbochargers arranged in parallel or in series, that is to say by means of multiple turbines arranged in parallel or in series.

The turbine may furthermore be equipped with a variable turbine geometry, which permits a more precise adaptation to the respective operating point of the internal combustion engine by means of an adjustment of the turbine geometry or of the effective turbine cross section. Here, adjustable guide blades for influencing the flow direction may be arranged in the inlet region of the turbine. In contrast to the rotor blades of the rotating rotor, the guide blades do not rotate with the shaft of the turbine.

If the turbine has a fixed, invariable geometry, the guide blades may be arranged in the inlet region so as to be not only stationary but rather also completely immovable, that is to say rigidly fixed. In contrast, in the case of a variable geometry, the guide blades may be duly also arranged so as to be stationary but not so as to be completely immovable, rather so as to be rotatable, such that the flow approaching the rotor blades can be influenced.

It is sought to arrange the turbine of an exhaust-gas turbocharger as close as possible to the outlet of the internal combustion engine in order thereby to be able to optimally utilize the exhaust-gas enthalpy of the hot exhaust gases, which is determined significantly by the exhaust-gas temperature and the exhaust-gas pressure, and to better enable a fast response behavior of the turbocharger.

In this connection, it is therefore also sought to minimize the thermal inertia of the exhaust-gas discharge system between the outlet and the turbine, which can be achieved by reducing the mass and the length of said part.

In this connection, embodiments of the internal combustion engine may be therefore also advantageous in which the turbine is arranged in the exhaust-gas discharge system upstream of the at least one further exhaust-gas aftertreatment system.

In the case of internal combustion engines with exhaust-gas turbocharging, embodiments may be advantageous in which the bypass line branches off from the intake system downstream of the compressor of the at least one exhaust-gas turbocharger.

In the case of an internal combustion engine supercharged by means of exhaust-gas turbocharging, in which the compressor of at least one exhaust-gas turbocharger is arranged in the intake system and the bypass line branches off from the intake system downstream of said compressor, the charge air conducted through the bypass line is heated or intensely warmed owing to compression, whereby the evaporation of the liquid urea and the preparation thereof to form ammonia as reducing agent for the at least one selective catalytic converter is assisted in an advantageous manner.

In this way, the temperature of the carrier stream and the temperature of the catalytic converter can be raised in a targeted manner, for example in inner-city traffic, if the relatively low exhaust-gas temperatures hinder effective exhaust-gas aftertreatment by means of the exhaust-gas stream as a carrier gas stream.

In the case of internal combustion engines in which a charge-air cooling arrangement is provided downstream of the compressor in order to cool the charge air, which has been compressed by means of the compressor, before said charge air enters the cylinders, embodiments may be advantageous in which the bypass line branches off from the intake system upstream of said charge-air cooler.

In conjunction with an exhaust-gas turbocharging arrangement, embodiments of the internal combustion engine may be advantageous in which an additional feed line issues into the bypass line downstream of the compressor of the at least one exhaust-gas turbocharger, in which feed line there is arranged a pump which draws in ambient air and delivers said ambient air into the bypass line.

That which has already been stated with regard to the use of a pump applies analogously. The pump serves for the provision of additional air, optionally from the environment, and thus for the at least partial compensation of the charge air that is extracted from the intake system.

Here, embodiments of the internal combustion engine may be advantageous in which the additional feed line issues into the bypass line so as to form a junction point, there being provided at the junction point a control element by means of which the charge-air flow rate conducted through the compressor of the at least one exhaust-gas turbocharger and the ambient-air flow rate drawn in through the additional feed line can be adjusted. That which has already been stated in conjunction with a control element applies here.

By means of the control element, the overall air stream conducted via the bypass line can be generated by mixing of the two partial air streams. The temperature and the pressure of the two partial air streams differ, such that mixing of the two partial air streams may for example also be utilized to adjust the temperature of the overall air stream flowing through the bypass line.

The second sub-object, that of specifying a method for operating an internal combustion engine of an above-stated type, is achieved by means of a method for operating an internal combustion engine having a control element for the adjustment of the air flow rate conducted through the bypass line, in which method the bypass line is opened in order to supply ammonia as reducing agent to the at least one selective catalytic converter.

That which has already been stated with regard to the internal combustion engine also applies to the method according, for which reason reference is generally made at this juncture to the statements made with regard to the internal combustion engine.

Method variants may be advantageous in which the bypass line is opened if the exhaust-gas temperature $T_{exhaust\ gas}$ is lower than a predefinable minimum exhaust gas temperature $T_{exhaust\ gas,\ min}$.

The exhaust-gas temperature in the catalytic converter, at the inlet into the catalytic converter or at other locations in the exhaust-gas discharge system may be used as reference exhaust-gas temperature $T_{exhaust\,gas,\,min}$.

Embodiments of the method may be advantageous in which the exhaust-gas temperature $T_{exhaust\,gas}$ is determined mathematically. The mathematical determination of the exhaust-gas temperature is carried out by means of simulation, for which use is made of models known from the prior art, for example dynamic heat models and kinetic models for determining the reaction heat generated during the combustion. As input signals for the simulation, operating parameters of the internal combustion engine which may be already available, that is to say which have been determined for other purposes.

The simulation calculation is characterized in that no further components, in particular no sensors, need be provided in order to determine the exhaust-gas temperature, which is expedient with regard to costs. It is however a disadvantage that the exhaust-gas temperature determined in this way is merely an estimated value, which can reduce the quality of the control or regulation.

For the estimation of an exhaust-gas temperature $T_{exhaust\,gas}$ at one location in the exhaust-gas discharge system, use may be made of the exhaust-gas temperature at another location in the exhaust-gas discharge system, which is for example also detected by measurement by means of a sensor.

Embodiments of the method may be advantageous in which the exhaust-gas temperature $T_{exhaust\,gas}$ is directly detected by measurement by means of a sensor.

The detection of a temperature by measurement provides more accurate temperature values, but may be difficult. This applies for example to the detection of the temperature of an exhaust-gas aftertreatment system by measurement, in which the lack of a possibility of arranging a temperature sensor in the exhaust-gas aftertreatment system can pose potential issues.

In contrast, the detection of the exhaust-gas temperature in an exhaust line by measurement may not pose difficulties.

Nevertheless, method variants may be advantageous in which the bypass line is opened if the exhaust-gas temperature $T_{exhaust\,gas}$ at the at least one selective catalytic converter is lower than a predefinable minimum exhaust-gas temperature $T_{exhaust\,gas,\,min}$. Here, the exhaust-gas temperature at the catalytic converter may be equated with the catalytic converter temperature $T_{SCR}$, i.e. the component temperature, and vice versa.

A further sub-object of specifying a method for operating an internal combustion engine of an above-stated type, is achieved by means of a method for operating an internal combustion engine having a turbocharger with a turbine positioned in the engine exhaust, a selective catalytic reducer (SCR) positioned downstream of the turbine and a compressor driven by the turbine comprising supplying compressed air from the compressor to the engine. The method comprises injecting a urea reductant into the SCR through a dosing device to reduce NOx and controlling temperature of the reductant within a predetermined range by portioning an air flow into the reductant within a predetermined range by portioning an air flow into the reductant between a portion of compressed air and ambient air.

Embodiments of the method may be advantageous in which the engine torque adjustment comprises adjusting exhaust flow across the turbine. Further, a wastegate may be coupled to the engine exhaust and positioned in parallel with the turbine and a wastegate control valve controlling exhaust flow through said wastegate wherein said engine torque adjustment comprises adjusting said wastegate valve.

Embodiment of the method may be advantageous in which a heat exchanger is positioned downstream of the compressor wherein a portion of the compressed air supplied across the dosing device is supplied from upstream the heat exchanger.

Method variants may be advantageous wherein the predetermined temperature is in a range between 150 to 170 degrees centigrade.

Another sub-object is a method comprising supplying compressed air to an engine from a compressor driven by a turbine coupled to exhaust from the engine for controlling temperature of a reductant dosing device injecting a reductant into a catalyst coupled to an exhaust. Controlling the temperature of the reductant to be within a predetermined range by passing over the reductant one or more of the following: a combination of compressed air and ambient air or a combination of the exhaust upstream and downstream of the turbine.

Embodiments of the method may be advantageous in which compressed air is supplied to the engine to achieve a desired torque.

Embodiments of the method may be advantageous in which a combination of compressed and ambient air is passed over said reductant for said temperature control, increasing said compressed air and decreasing said ambient air in said combination increases said temperature, and decreasing said compressed air and increasing said ambient air decreases said temperature.

Further, the method may correct for engine torque to compensate for changes in said torque.

Method variants may be advantageous in which the correction of the torque may be enacted by changing one or more of the following: changing position of a throttle controlling flow of said ambient air into said engine, changing timing of injecting fuel into said engine, and/or changing said exhaust flow upstream of said turbine.

Method variants may be advantageous wherein said temperature control further comprises passing said combination of said exhaust upstream and downstream of the turbine over the reductant when the torque correction is unable to fully correct for changes in the torque.

Embodiments of the method may be advantageous wherein the combination of the exhaust upstream and downstream of the turbine is passed over the reductant to achieve the temperature control, increasing the exhaust upstream of the turbine and decreasing the exhaust downstream of the turbine increase the temperature, and decreasing the exhaust upstream of the turbine and increasing the exhaust downstream of the turbine decreases the temperature.

Method variants may be advantageous wherein correcting engine torque to compensate for changes in said torque by the passing the exhaust upstream of said turbine over the reductant.

Method variants may be advantageous wherein said torque correction comprises changing one or more of the following: changing position of a throttle controlling flow of the ambient air into the engine, changing timing of injecting fuel into the engine, and/or changing the compressed air flow.

Method variants may be advantageous wherein the temperature control further comprises passing the combination of the compressed air and the ambient air over the reductant when the torque correction is unable to fully correct for changes in the torque.

Embodiments may be advantageous wherein the catalyst is a selective reduction catalyst.

Embodiments may be advantageous wherein a dosing element to inject the reductant is positioned in a bypass line coupled to an inlet of said catalyst.

Embodiments may be advantageous wherein the compressed air and the ambient air may be coupled to an air line coupled to the bypass line and further comprising a control element coupled to said air line for controlling an amount of compressed air and an amount of the ambient air entering said dosing line to control said temperature.

Method variants may be advantageous wherein the exhaust upstream of the turbine and downstream of the turbine may be coupled to a line coupled to the bypass line and further comprising a control valve coupled to said line for controlling an amount of said exhaust upstream of the turbine and an amount of said exhaust downstream of the turbine entering said bypass line to control said temperature.

Embodiments may be advantageous wherein the reductants is urea and the predetermined temperature rang enables the conversion of the urea to ammonia.

A further sub-object is a method comprising injecting a reductant into a catalyst coupled to the exhaust and passing a mixture of compressed air, exhaust from upstream of a turbine and exhaust from downstream of a turbine to the injected reductant.

Embodiments may be advantageous wherein the method further comprises adjusting relative amounts of the compressed air, upstream exhaust, and downstream exhaust in the mixture responsive to temperature of the reductant.

Embodiments may be advantageous wherein adjusting the relative amounts includes: during a first condition, adjusting relative amounts of upstream and downstream exhaust responsive to temperature while maintaining the compressed air amount in the mixture; and during a second condition, adjusting the amount of compressed air while maintaining the relative amounts of upstream and downstream exhaust in the mixture.

Method variants may be advantageous wherein the first condition and second condition may be selected responsive to compressor surge.

Method variants may be advantageous wherein the first condition and second condition may be mutually exclusive.

In one example, a method for controlling an engine having a turbocharger with a turbine positioned in the engine exhaust, a Selective Catalytic Reducer (SCR) positioned downstream of the turbine, and a compressor driven by the turbine, comprising: supplying compressed air from the compressor to the engine to achieve a torque; injecting a urea reductant into the SCR through a dosing device to reduce NOx; controlling temperature of said dosing device to be within a predetermined range for conversion of said urea to ammonia by one or more of the following: portioning an air flow across said dosing device between a portion of said compressed air and another portion of ambient air; or, portioning an exhaust flow across said dosing device between a portion of said exhaust upstream and downstream of the turbine; adjusting engine torque to compensate for said portioning of said compressed air; and when said portioning airflow is used for said temperature control and said engine torque adjusting reaches a threshold, then change from said portioning airflow to said portioning exhaust flow for said temperature control.

The method may further comprise changing from said portioning exhaust flow for said temperature control to said portioning airflow for said temperature control when said said portioning exhaust flow is used for said temperature control and said engine torque adjusting reaches said threshold. In examples, said compressed air is supplied to the engine through a cooler downstream of the compressor, and said portioning said compressed air comprises portioning said compressed air upstream of said cooler and said torque adjustment may comprises one or more of the following: adjusting position of a throttle controlling an amount of ambient air entering the engine; controlling timing of injecting fuel into the engine; controlling timing of igniting spark plugs coupled to a combustion chamber of the engine; controlling said portioning of said compressed air; and/or controlling said portioning of said exhaust upstream of the turbine.

FIG. 1 schematically shows, in the form of a diagrammatic sketch, a first embodiment of the internal combustion engine 1.

The internal combustion engine 1 has an intake system 2 for the supply of charge air and has an exhaust-gas discharge system 3 for the discharge of the exhaust gases. An exhaust-gas turbocharger 4 is provided for supercharging purposes. The compressor 4a of the exhaust-gas turbocharger 4 is arranged in an intake line 2a of the intake system 2, and the turbine 4b of the exhaust-gas turbocharger 4 is arranged in an exhaust line 3a of the exhaust-gas discharge system 3.

Various systems 5, 5a, 6, 6a, 7 for exhaust-gas aftertreatement may be provided downstream of the turbine 4b.

Two selective catalytic converters 6, 7 may be provided for the reduction of nitrogen oxides, wherein a further exhaust-gas aftertreatment system 5 is arranged upstream of said two selective catalytic converters 6, 7. In the present case, the further exhaust-gas aftertreatment system 5 is an oxidation catalytic converter 5a, wherein the selective catalytic converter 6, which is arranged downstream of the oxidation catalytic converter 5a in the exhaust line 3a, is formed integrally with a particle filter 6a as a combined exhaust-gas aftertreatment system. A second selective catalytic converter 7 is arranged in the exhaust-gas discharge system 3 downstream of the first selective catalytic converter 6 which is formed integrally with the particle filter 6a.

A bypass line 8 branches off from the intake system 2 downstream of the compressor 4a and issues into the exhaust-gas discharge system 3 between the oxidation catalytic converter 5a and the combined exhaust-gas aftertreatment system comprising the first selective catalytic converter 6 and the particle filter 6a.

A dosing device 9 is provided for introducing liquid urea into the bypass line 8 in order to be able to generate, that is to say provide, ammonia which serves as reducing agent for the selective catalytic converters 6, 7. A mixer 10 is provided in the bypass line 8 downstream of the dosing device 9, which mixer mixes the ammonia, which serves as reducing agent, with the charge air in order to form as homogeneous an air-ammonia mixture as possible, which flows through the catalytic converters 6, 7.

Likewise arranged in the bypass line 8 is a control element 11 which serves for adjusting the air flow rate conducted through the bypass line 8. A pivotable flap 11a may serve as a control element 11.

Figure 2:
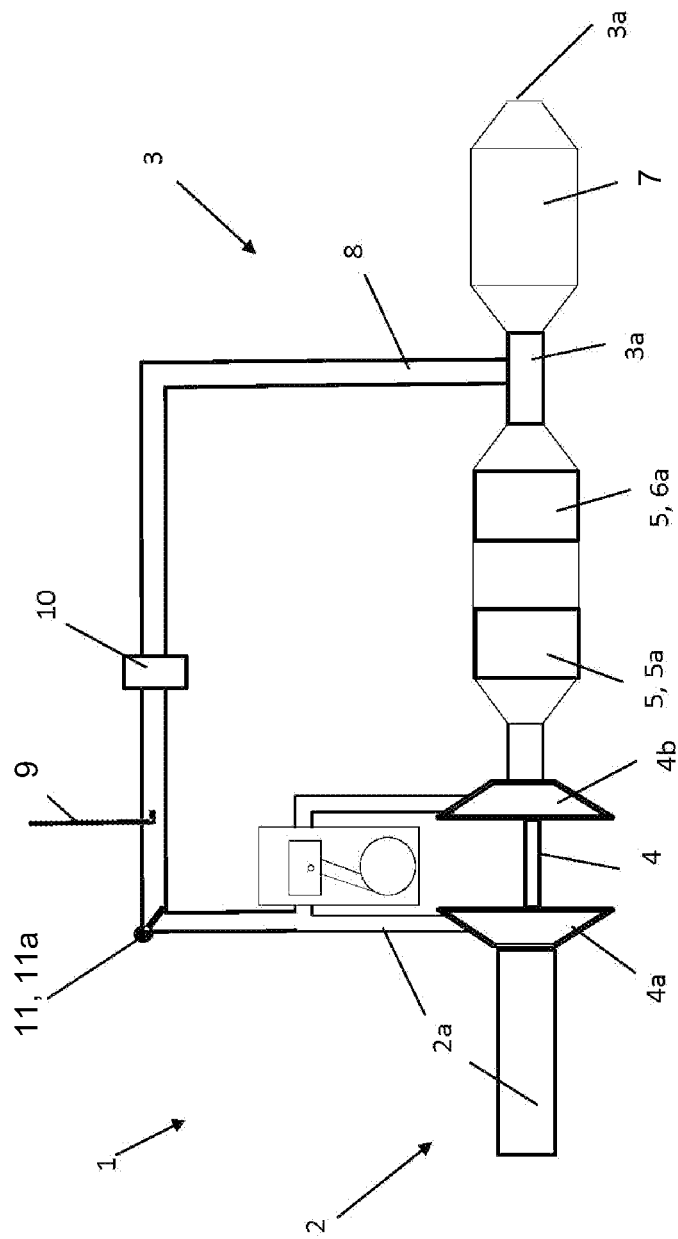
FIG. 2 schematically shows, in the form of a diagrammatic sketch, a second embodiment of the internal combustion engine.

FIG. 2 schematically shows, in the form of a diagrammatic sketch, a second embodiment of the internal combustion engine 1. It is sought to explain only the differences in relation to the embodiment illustrated in FIG. 1, for which reason reference is otherwise made to FIG. 1. The same reference symbols have been used for the same components.

By contrast to the embodiment illustrated in FIG. 1, no combined exhaust-gas aftertreatment system comprising a selective catalytic converter and a particle filter is provided in the case of the internal combustion engine 1 illustrated in FIG. 2. Instead, an oxidation catalytic converter 5a and a particle filter 6a, as further exhaust-gas aftertreatment systems 5, may be arranged in the exhaust-gas discharge system 3 upstream of a single selective catalytic converter 7. The oxidation catalytic converter 5a is arranged upstream of the particle filter 6a, wherein the bypass line 8 issues into the exhaust-gas discharge system 3 between the particle filter 6a and the selective catalytic converter 7.

Figure 3A:
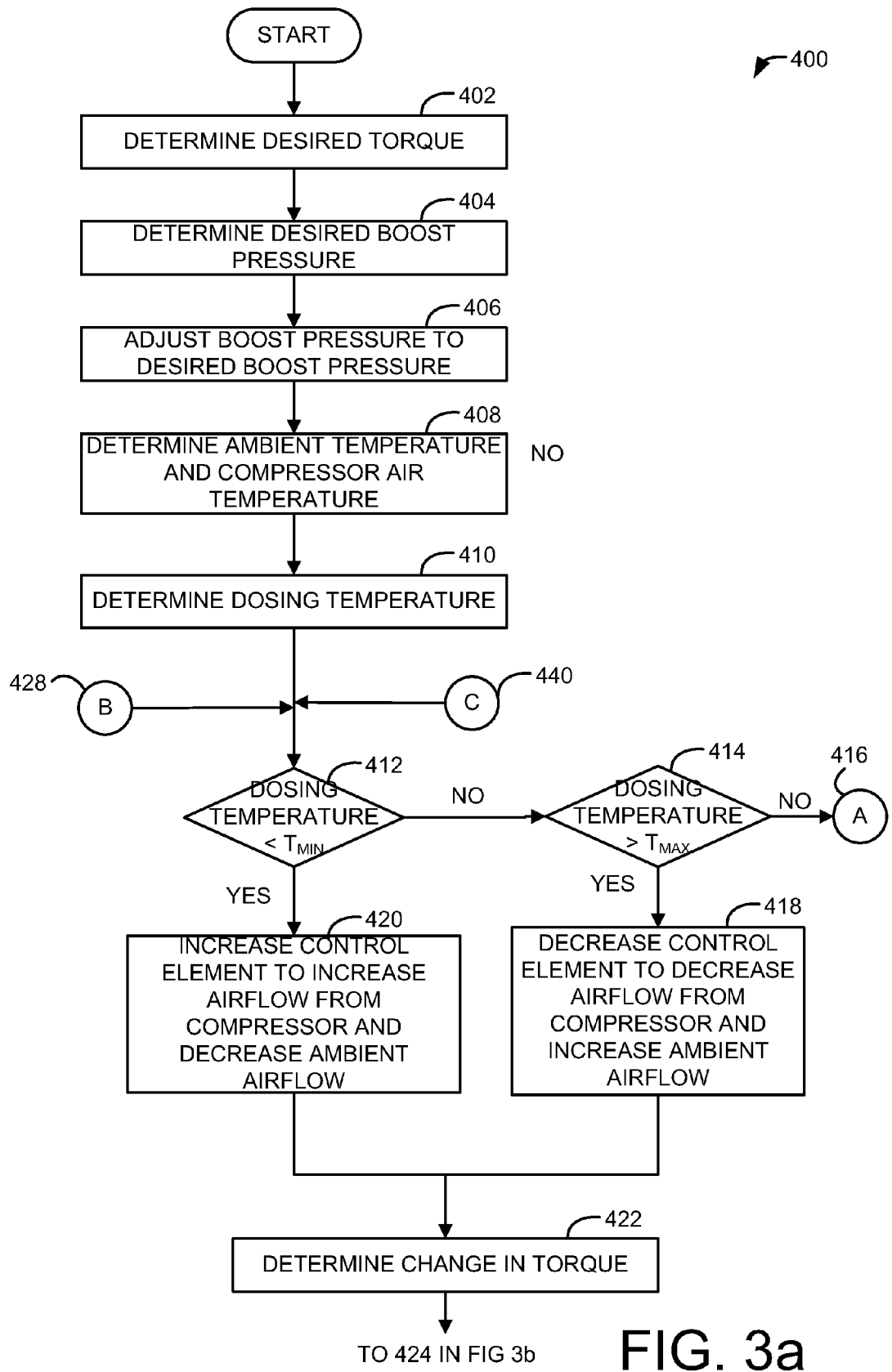
FIGS. 3a and 3b show an example method to operate an internal combustion engine according to the first or second embodiment.
Figure 3B:
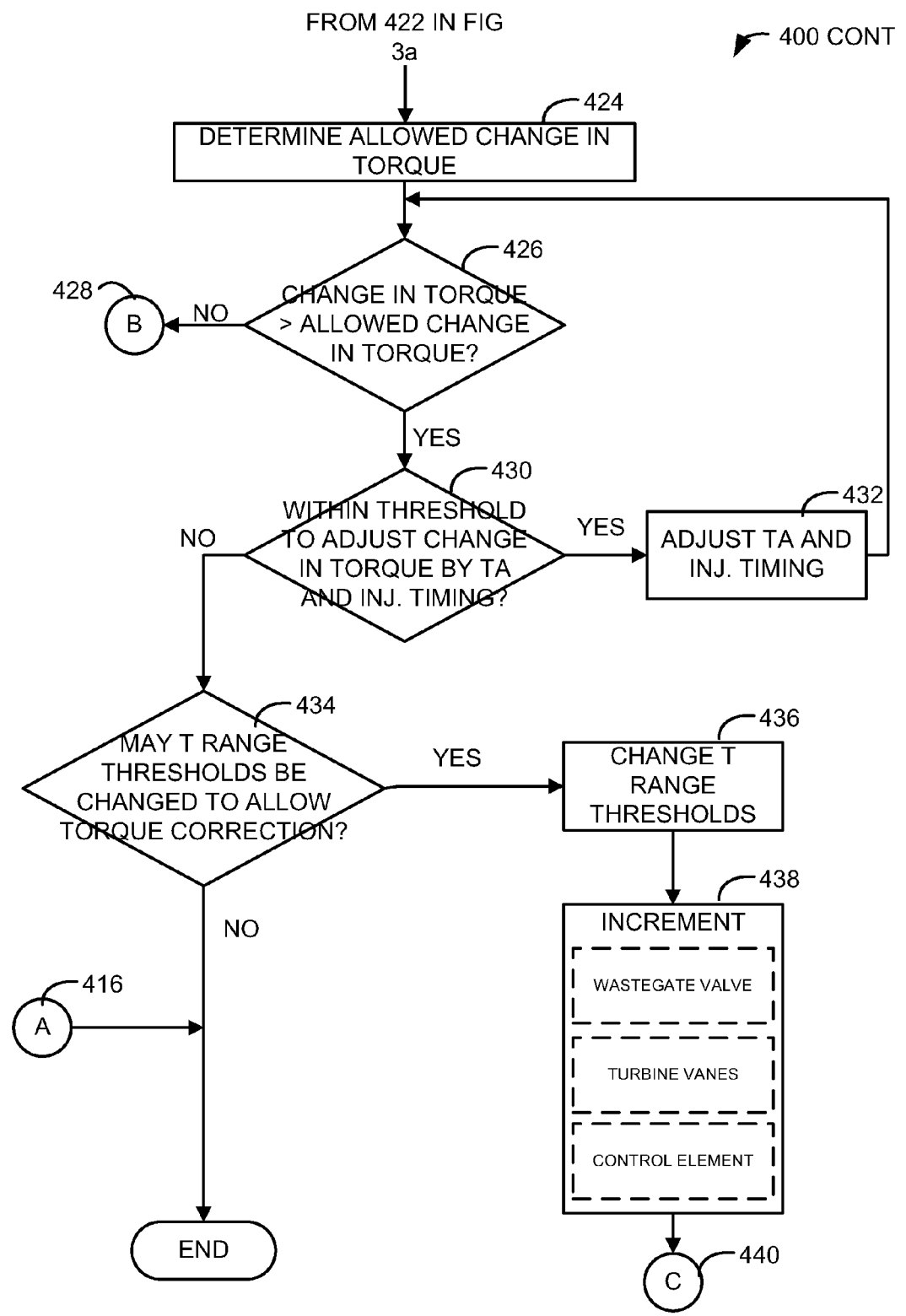

Turning to FIGS. 3a and 3b an example method to control the dosing temperature of the reductant is shown.

At 402 the method may determine the desired torque. The desired torque may be determined from the engine speed, driver input, various sensors, etc.

At 404 the method may determine the desired boost pressure for the desired torque at step 402.

At 406 the method may adjust the boost pressure to the boost pressure desired determined at 404. The boost pressure may be adjusted to meet the boost pressure desired by adjusting one or more of the following: the variable turbo nozzle, a wastegate valve (not shown) positioned in an exhaust wastegate line (not shown) in parallel with the turbine for diverting a portion of exhaust flow across the turbine thereby controlling exhaust flow through the turbine and boost. The control element also may be used to adjust boost by diverting air from the compressor away from the engine air intake.

At 408 the method may determine the ambient temperature and the compressor air temperature. For example, the temperatures may be measured by sensors, determined from engine operating parameters such as boost pressure, or may be estimated by a simulation calculation.

At 410 the method may determine the dosing temperature. The dosing temperature may be determined for the ambient temperature and the compressor air temperature determined at 408. Further the dosing temperature may be determined by a sensor.

At 412 the method may determine if the dosing temperature is below a minimum threshold temperature. If no, the method may proceed to 414 and further determine if the dosing temperature is above a maximum threshold temperature. If no, the method may continue to 416 and no further steps may be needed. If yes at 414, the method may proceed to 418 and decrease the control element to decrease air flow from the compressor and increase the ambient air flow across the dosing device thereby decreasing its temperature.

If yes at 412, the method may increase the control element to increase the air flow from the compressor and decrease the ambient air flow across the dosing device to increase its temperature.

From either 418 or 420 the method may proceed to 422. At 422 the method may determine a change in torque based on the change to the air flow from the compressor in either step 418 or 420.

At 424 the method may determine the allowed change in torque. The allowed change in torque may be determined based on engine load, tip in, engine temperature, etc. For example, at low load the allowed change in torque may have a greater range and the method may give more weight to temperature regulation of the bypass line. As another example, at high load or medium load and tip in, the allowed change in torque may have a lower range and the method may give a lower weight to temperature regulation of the bypass line.

At 426 the method may determine if the change in torque is greater than the allowed change in torque. If no, the method may proceed to 428 and rejoin the method at 412.

If yes, the method may proceed to 430 and determine if the change in torque is within a threshold to adjust the change in torque by throttle angle TA and/or injection timing. If no, the change in torque is outside the threshold the method may continue to 442. If yes, the method may proceed to 432 and adjust the TA and/or injection timing before rejoining the method at 426.

At 442 the method may determine if the temperature range thresholds may be changed to allow for torque correction.

If yes, the method may proceed to 436 and change the temperature range thresholds. At 438 the method may increment the wastegate valve, turbine vanes, or control element to change the engine torque. The method may then continue to 440 and rejoin the method at 412 to further change compressor and ambient airflow to correct dosing temperature with the now allowed greater range of permitted temperatures.

If no at 442, the method may end.

A further potential approach include the internal combustion engine comprising an intake system for the supply of charge air, an exhaust gas discharge system for the discharge of the exhaust gases with at least one selective catalytic converter being arranged, as a further exhaust gas aftertreatment system, in the exhaust gas discharge system upstream of the at least on selective catalytic converter, further comprises a bypass line which branches off from the intake system and issues into the exhaust gas discharge system between the oxidation catalytic converter and the at least one selective catalytic converter, a dosing device being provided for introducing liquid urea as a reducing agent for the at least one selective catalytic converter into the bypass line.

A method for controlling an engine having a selective catalytic reducer (SCR) coupled to an engine exhaust comprising supplying compressed air to the engine to achieve a desired torque, injecting a reductant into the SCR, controlling a temperature of the reductant between a portion of said compressed air and ambient, and adjusting engine torque to compensate for said portioning of said compressed air.

A method for controlling an engine having a turbocharger with a turbine positioned in the engine exhaust, a selective catalytic reducer (SCR) positioned downstream of the turbine and a compressor driven by the turbine comprising supplying compressed air from the compressor to the engine, injecting a urea reductant into the SCR through a dosing device to reduce NOx, controlling temperature of the dosing device to be within a predetermined range for conversion of the urea to ammonia by portioning an air flow across the dosing device between a portion of said compressed air and another portion of ambient air, and adjusting engine torque to compensate for said portioning of the compressed air.

Figure 4:
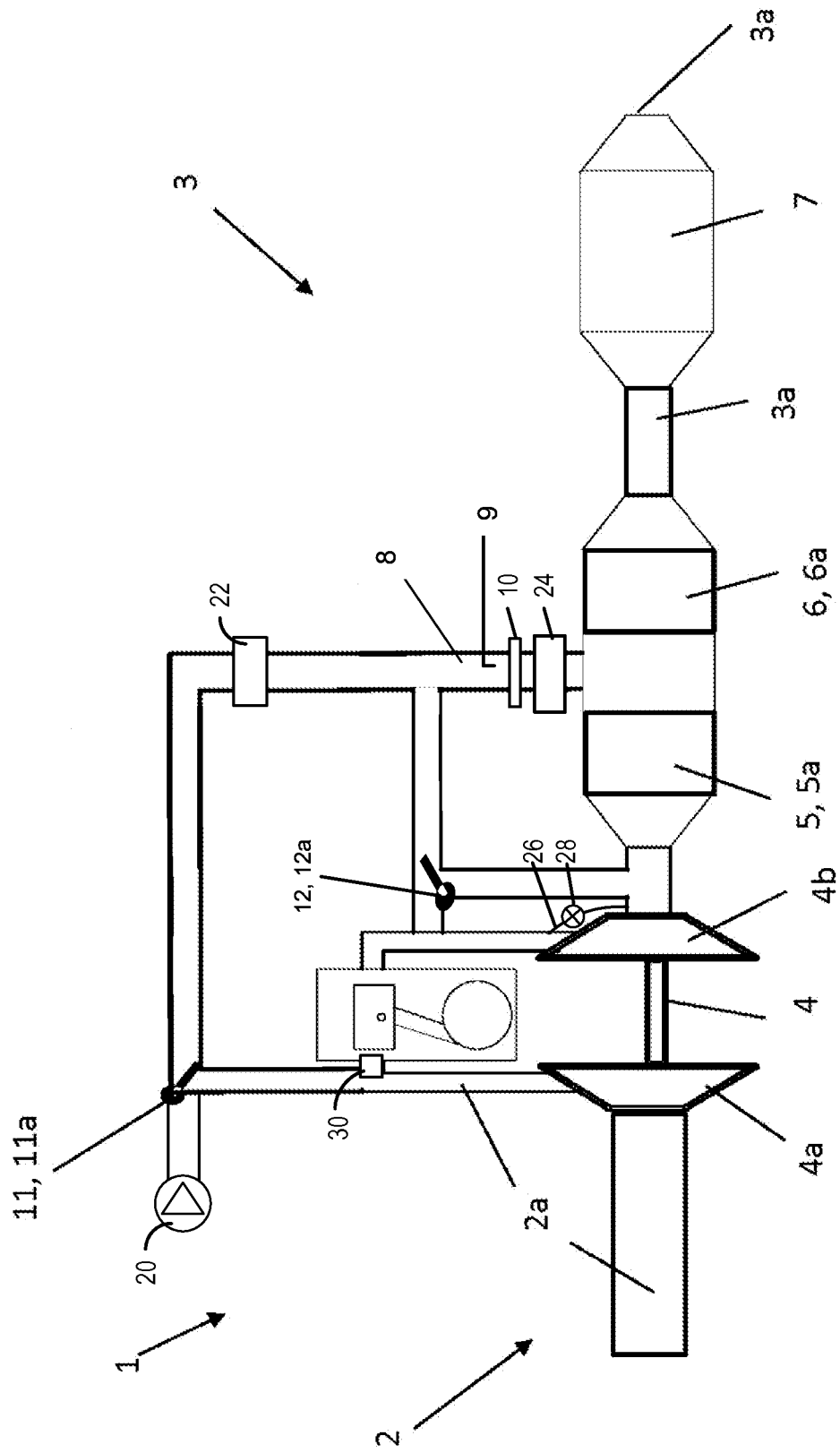
FIG. 4 schematically shows, in the form of a diagrammatic sketch, the first embodiment combined with an exhaust bypass line.

Turning to FIG. 4 a schematic of a compressor bypass line connected to a turbine bypass line is shown. The internal combustion engine 1 has an intake system 2 for the supply of charge air and has an exhaust-gas discharge system 3 for the discharge of the exhaust gases. An exhaust-gas turbocharger 4 is provided for supercharging purposes. The compressor 4a of the exhaust-gas turbocharger 4 is arranged in an intake line 2a of the intake system 2, and the turbine 4b of the exhaust-gas turbocharger 4 is arranged in an exhaust line 3a of the exhaust-gas discharge system 3. A wastegate 26 may be coupled to the engine exhaust and positioned in parallel with the turbine and a wastegate control valve 28 may be positioned in the wastegate 26 controlling exhaust flow through said wastegate.

Various systems 5, 5a, 6, 6a, 7 for exhaust-gas aftertreatment may be provided downstream of the turbine 4b.

Two selective catalytic converters 6, 7 may be provided for the reduction of nitrogen oxides, wherein a further exhaust-gas aftertreatment system 5 is arranged upstream of said two selective catalytic converters 6, 7. In the present case, the further exhaust-gas aftertreatment system 5 is an oxidation catalytic converter 5a, wherein the selective catalytic converter 6, which is arranged downstream of the oxidation catalytic converter 5a in the exhaust line 3a, is formed integrally with a particle filter 6a as a combined exhaust-gas aftertreatment system. A second selective catalytic converter 7 is arranged in the exhaust-gas discharge system 3 downstream of the first selective catalytic converter 6 which is formed integrally with the particle filter 6a.

A bypass line 8 branches off from the intake system 2 downstream of the compressor 4a, upstream of the turbine, and downstream of the turbine and issues into the exhaust-gas discharge system 3 between the oxidation catalytic converter 5a and the combined exhaust-gas aftertreatment system comprising the first selective catalytic converter 6 and the particle filter 6a. An additional feed line issues into the bypass line downstream of the compressor of the at least one exhaust-gas turbocharger, in which feed line there is arranged a pump 20 which draws in ambient air and delivers said ambient air into the bypass line. Further, a heat exchanger 30 may be positioned downstream of the compressor and the bypass line 8 may branch off from upstream the heat exchanger 30.

A dosing device 9 (e.g., an injector) is provided for introducing liquid urea into the bypass line 8 in order to be able to generate, that is to say provide, ammonia which serves as reducing agent for the selective catalytic converters 6, 7. A mixer 10 is provided in the bypass line 8 downstream of the dosing device 9, which mixer mixes the ammonia, which serves as reducing agent, with the charge air in order to form as homogeneous an air-ammonia mixture as possible, which flows through the catalytic converters 6, 7. A heater 22 may be provided in the bypass line upstream of the dosing device. A catalytic converter 24 for the catalytic assistance of the hydrolysis of isocyanic acid may be provided downstream of the dosing device.

Likewise arranged in the bypass line 8 is a control element 11 which serves for adjusting the air flow rate conducted through the bypass line 8 from the compressor bypass line and the ambient air. A pivotable flap 11a may serve as a control element 11. A diverter valve 12 is arranged in the bypass line 8 which serves for adjusting the exhaust gas flow rate conducted through the bypass line 8 from the first and second exhaust bypass line segments. A pivotable flap 12a may serve as the diverter valve 12.

Figure 5:
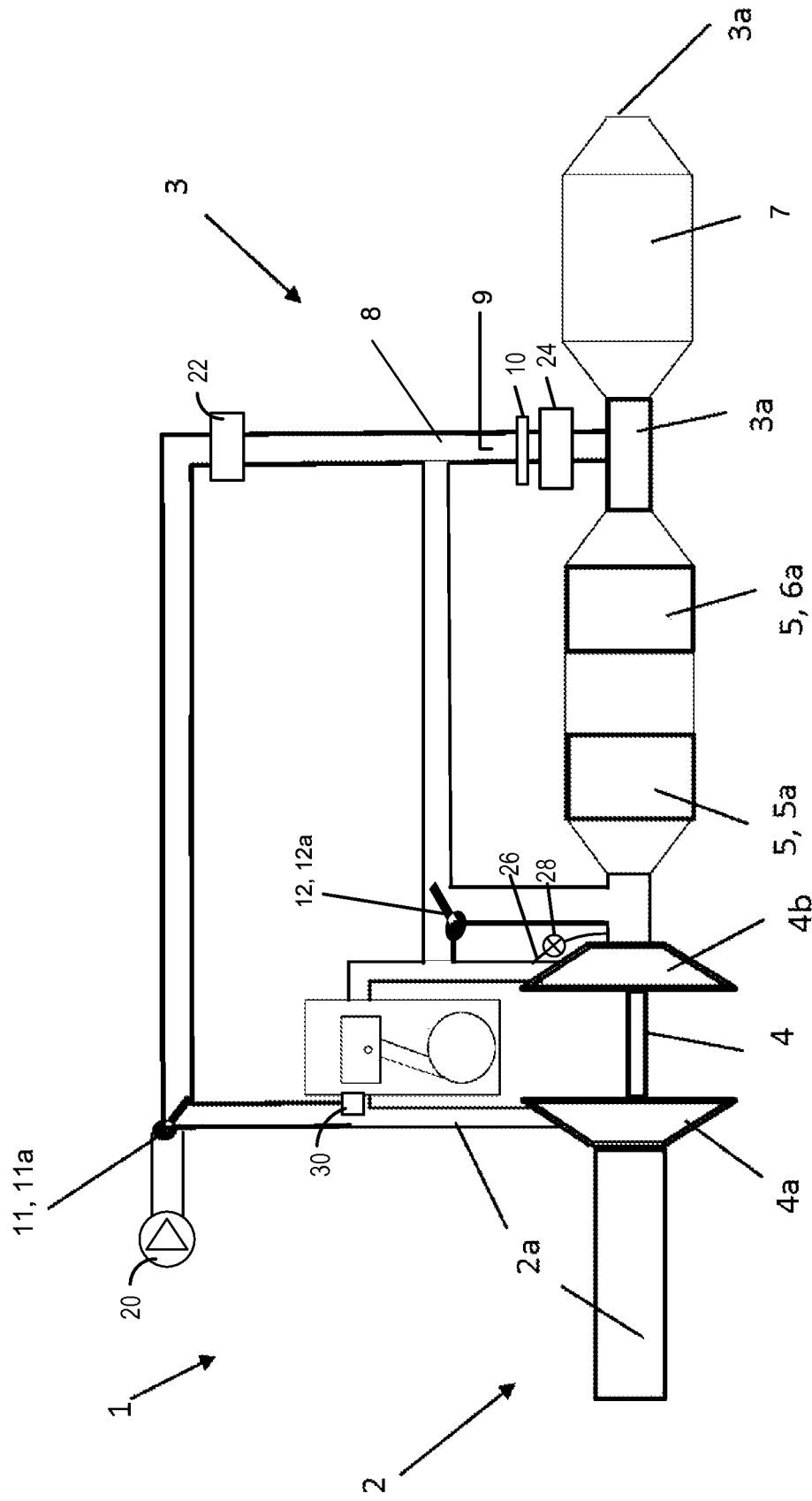
FIG. 5 schematically shows, in the form of a diagrammatic sketch, the second embodiment combined with an exhaust bypass line.

FIG. 5 schematically shows, in the form of a diagrammatic sketch, the compressor bypass line connected to a turbine bypass line of the internal combustion engine 1. It is sought to explain only the differences in relation to the embodiment illustrated in FIG. 4, for which reason reference is otherwise made to FIG. 4. The same reference symbols have been used for the same components.

By contrast to the embodiment illustrated in FIG. 4, no combined exhaust-gas aftertreatment system comprising a selective catalytic converter and a particle filter is provided in the case of the internal combustion engine 1 illustrated in FIG. 4. Instead, an oxidation catalytic converter 5a and a particle filter 6a, as further exhaust-gas aftertreatment systems 5, may be arranged in the exhaust-gas discharge system 3 upstream of a single selective catalytic converter 7. The oxidation catalytic converter 5a is arranged upstream of the particle filter 6a, wherein the bypass line 8 issues into the exhaust-gas discharge system 3 between the particle filter 6a and the selective catalytic converter 7.

Figure 6A:
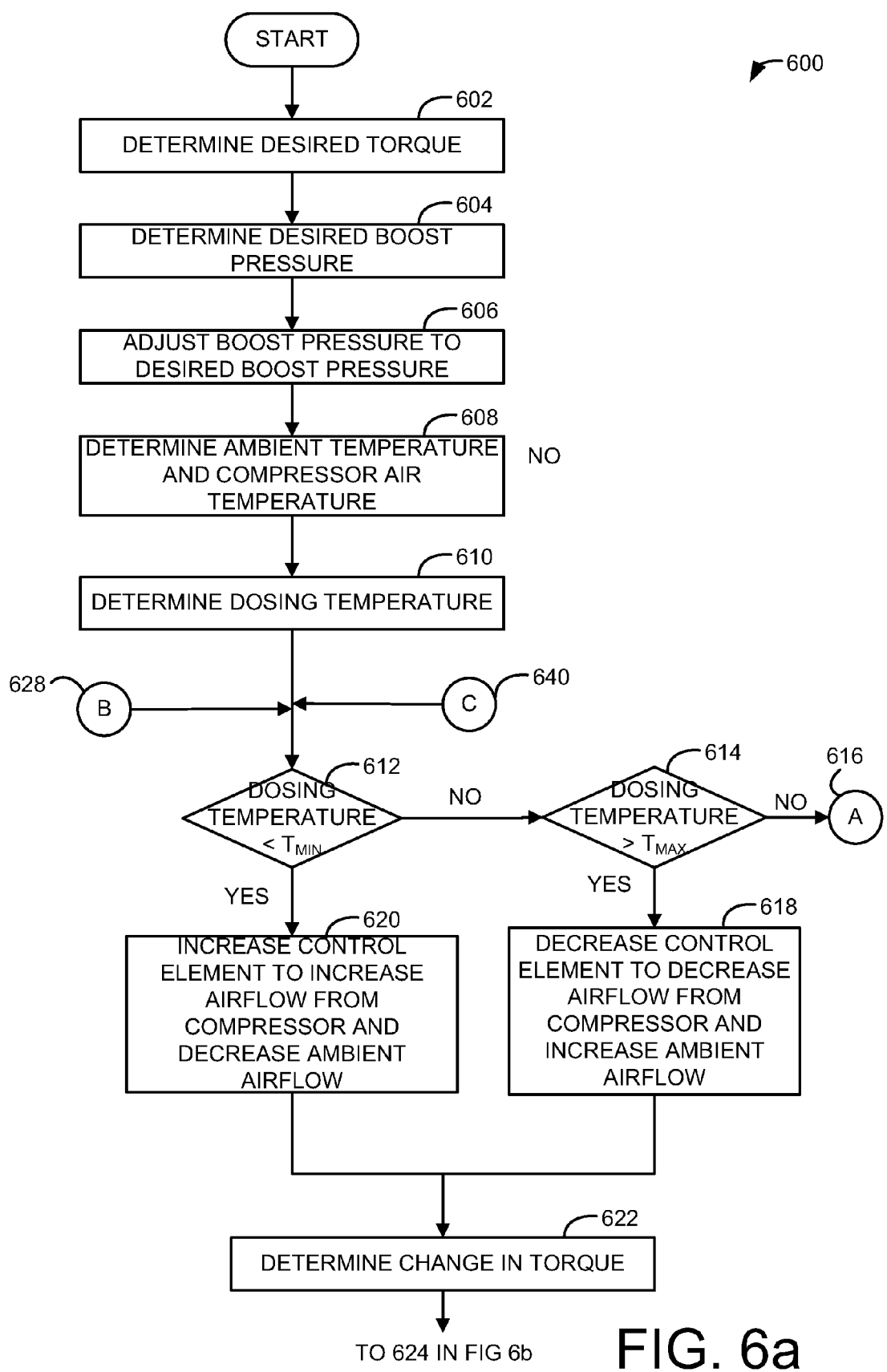
FIGS. 6a, 6b and 6c show an example method to operate an internal combustion engine as shown in FIG. 4 or 5.
Figure 6B:
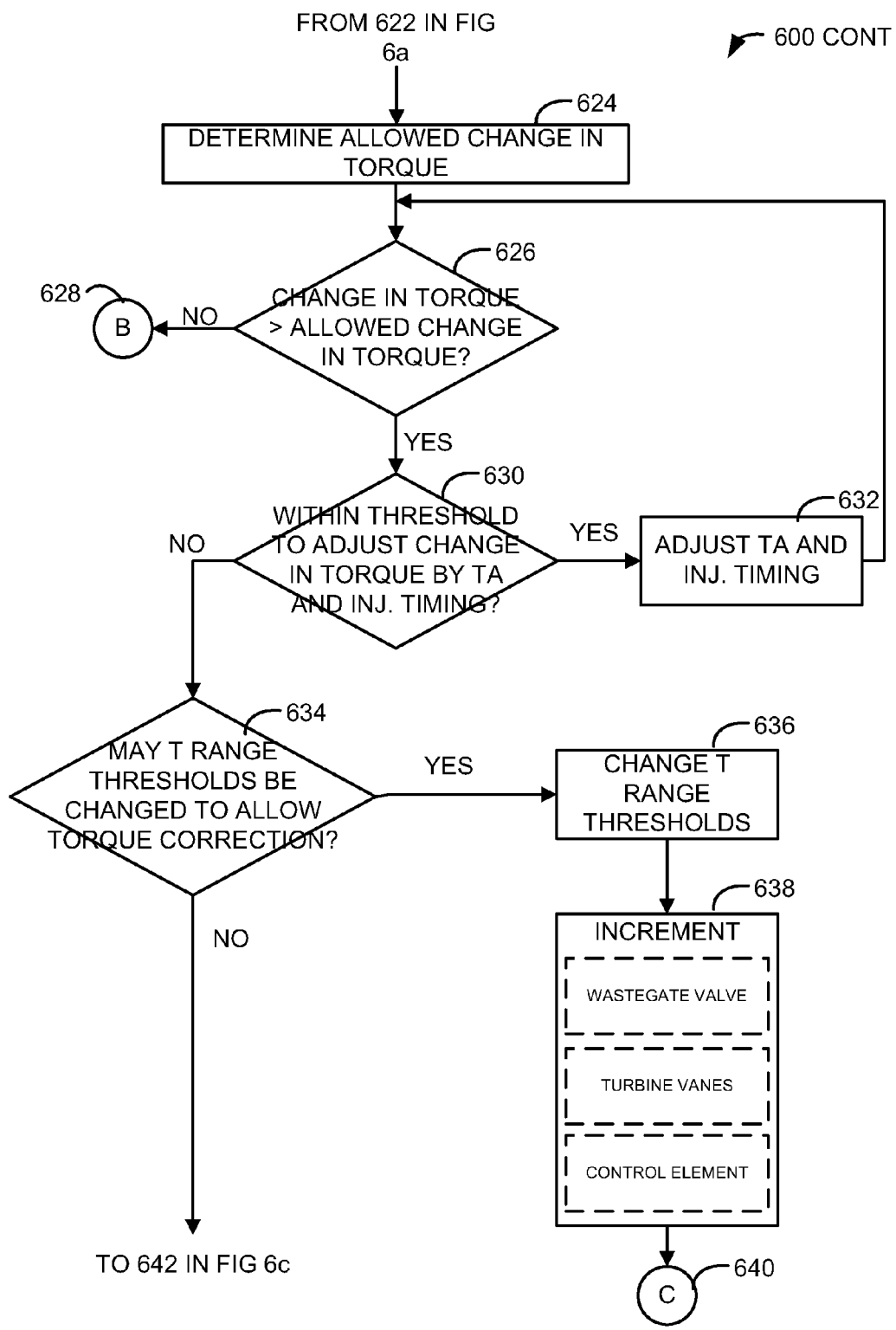
Figure 6C:
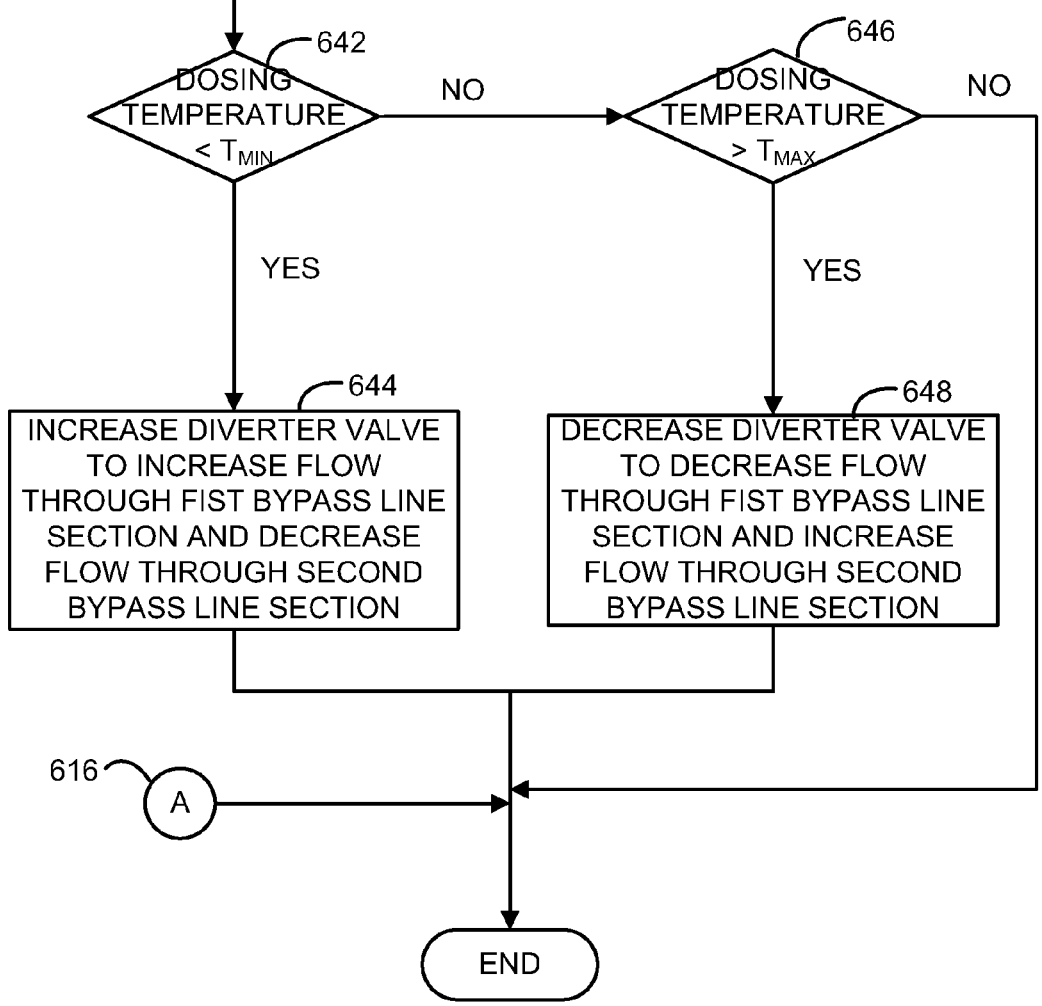

Turning to FIGS. 6a, 6b and 6c an example method for controlling reductant dosing temperature is shown.

At 602 the method may determine the desired torque. The desired torque may be determined from the engine speed, driver input, various sensors, etc.

At 604 the method may determine the desired boost pressure for the desired torque at step 602.

At 606 the method may adjust the boost pressure to the boost pressure desired determined at 604. The boost pressure may be adjusted to meet the boost pressure desired by adjusting one or more of the following: the variable turbo nozzle, or a wastegate valve (not shown) positioned in an exhaust wastegate line (not shown) in parallel with the turbine for diverting a portion of exhaust flow across the turbine thereby controlling exhaust flow through the turbine and boost. The control element also may be used to divert a portion of air from the compressor away from the engine air intake and change torque. Further, the diverter valve also may be used to reduce exhaust airflow across the turbine and change engine torque.

At 608 the method may determine the ambient temperature and the compressor air temperature. For example, the temperatures may be measured by sensors, determined from engine operating parameters such as boost pressure, or may be estimated by a simulation calculation.

At 610 the method may determine the dosing temperature. The dosing temperature may be determined for the ambient temperature and the compressor air temperature determined at 408. Further the dosing temperature may be determined by a sensor.

At 612 the method may determine if the dosing temperature is below a minimum threshold temperature. If no, the method may proceed to 614 and further determine if the dosing temperature is above a maximum threshold temperature. If no, the method may continue to 616 and no further steps may be needed. If yes at 614, the method may proceed to 618 and decrease the control element to decrease air flow from the compressor and increase the ambient air flow across the dosing device thereby decreasing its temperature.

If yes at 612, the method may increase the control element to increase the air flow from the compressor and decrease the ambient air flow across the dosing device to increase its temperature.

From either 618 or 620 the method may proceed to 622. At 622 the method may determine a change in torque based on the change to the air flow from the compressor in either step 618 or 620.

At 624 the method may determine the allowed change in torque. The allowed change in torque may be determined based on engine load, tip in, engine temperature, etc. For example, at low load the allowed change in torque may have a greater range and the method may give more weight to temperature regulation of the bypass line. As another example, at high load or medium load and tip in, the allowed change in torque may have a lower range and the method may give a lower weight to temperature regulation of the bypass line.

At 626 the method may determine if the change in torque is greater than the allowed change in torque. If no, the method may proceed to 628 and rejoin the method at 612.

If yes, the method may proceed to 630 and determine if the change in torque is within a threshold to adjust the change in torque by throttle angle TA and/or injection timing. If no, the change in torque is outside the threshold the method may continue to 634. If yes, the method may proceed to 632 and adjust the TA and/or injection timing before rejoining the method at 626.

At 634 the method may determine if the temperature range thresholds may be changed to allow for torque correction.

If yes, the method may proceed to 636 and change the temperature range thresholds. At 638 the method may increment the wastegate valve, turbine vanes, or control element to change the engine torque. The method may then continue to 640 and rejoin the method at 612 to further change compressor and ambient air flow to correct dosing temperature with the now allowed greater range of permitted temperatures.

If no at 634, the method may proceed to 642 on FIG. 6c and determine if the reductant dosing temperature is below a minimum threshold. If yes, the method may proceed to 644 and increase the diverter valve to increase the flow of exhaust gas through the first bypass line section and decrease the flow through the second bypass line section to increase temperature across the dosing device. The method may then end.

If no at 642 the method may proceed to 646 and determine if the reductant dosing temperature is above a temperature threshold maximum. If no, the method may end. If yes, the method may proceed to 648 and decrease the diverter valve to decrease the flow of exhaust gas through the first bypass line section and increase the flow of exhaust gas through the second bypass line section to decrease temperature across the dosing device. The method may then end.

In the particular example described above with reference to FIGS. 6a, 6b, and 6c, temperature of the dosing device was first controlled by portioning airflow between compressed air and ambient air, and when engine torque changed beyond and allowed change that could not be adjusted by TA or injector timing, the dosing temperature was corrected by portioning exhaust flow between upstream and downstream of the turbine. In another example of operation, the approach may be reversed. Temperature of the dosing device may first be controlled by portioning exhaust flow, and torque changes may then result in the temperature being controlled by portioning airflow.

Further, the method may adjust the relative amounts of the compressed air, upstream exhaust, and downstream exhaust in the mixture responsive to temperature of the reductant concurrently or mutually exclusively. In one example, the method may adjust the relative amounts of the compressed air and the upstream exhaust and downstream exhaust responsive to the dosing temperature. Another example of the method may adjust the amount of the compressed air while maintaining the amounts of the upstream exhaust and downstream exhaust responsive to the desired torque. Another example of the method may adjust the upstream exhaust and downstream exhaust while maintaining the compressed air amount responsive to compressor surge.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. An internal combustion engine comprising:
an intake system including an intake line for the supply of charge air;
an exhaust-gas discharge system for the discharge of exhaust gases;
at least one selective catalytic converter arranged in the exhaust-gas discharge system for the reduction of nitrogen oxides;
an oxidation catalytic converter being arranged in the exhaust-gas discharge system upstream of the at least one selective catalytic converter; wherein
a bypass line branches off from the intake system downstream of a compressor and issues into the exhaust-gas discharge system between the oxidation catalytic converter and the at least one selective catalytic converter;
a dosing injector being provided for introducing liquid urea as a reducing agent for the at least one selective catalytic converter into the bypass line; and
an additional feed line issues into the bypass line to deliver ambient air into the bypass line and a control element is coupled at a junction between the additional feed line and the bypass line to control an amount of compressed air and an amount of the ambient air entering said bypass line to control a temperature of the liquid urea.

2. The internal combustion engine as claimed in claim 1, wherein a mixer is provided in the bypass line downstream of the dosing injector.

3. The internal combustion engine as claimed in claim 1, wherein, upstream of the dosing injector, there is provided a pump positioned in the additional feed line which draws in the ambient air and delivers said ambient air into the bypass line.

4. The internal combustion engine as claimed in claim 1, wherein, downstream of the dosing injector, there is provided a catalytic converter for the catalytic assistance of hydrolysis of isocyanic acid.

5. The internal combustion engine as claimed in claim 1, wherein the control element is configured to adjust an air flow rate conducted through the bypass line.

6. The internal combustion engine as claimed in claim 1, wherein the compressor is a compressor of an exhaust-gas turbocharger, the compressor of the exhaust-gas turbocharger being arranged in the intake system, and a turbine of the exhaust-gas turbocharger being arranged in the exhaust-gas discharge system.

7. The internal combustion engine as claimed in claim 1, wherein a heater is provided in the bypass line upstream of the dosing injector to control the temperature of the liquid urea.

8. A method for controlling an engine having a selective catalytic reducer (SCR) coupled to an engine exhaust comprising:
supplying compressed air to the engine to achieve a desired torque;
injecting a reductant into the SCR;
controlling temperature of said reductant within a predetermined range by portioning an air flow into said reductant between a portion of said compressed air and ambient air; and
adjusting engine torque to compensate for said portioning of said compressed air.

9. The method as claimed in claim 8 further comprising controlling the temperature of said reductant by operating a heater within a bypass line.

10. The method recited in claim 8 wherein said compressed air is provided by an air pump.

11. The method recited in claim 8 wherein said portion of said compressed air is increased and said portion of said ambient air is decreased when said reductant temperature is less than said predetermined range.

12. The method recited in claim 8 wherein said portion of said compressed air is decreased and said portion of said ambient air is increased when said reductant temperature is greater than said predetermined range.

13. The method recited in claim 8 wherein said engine torque adjustment comprises adjusting one or more of the following: throttle angle of a throttle blade positioned in an air intake of the engine, or fuel injection timing of fuel injectors injecting fuel into the engine.

14. A method for controlling an engine having a turbocharger with a turbine positioned in the engine exhaust, a selective catalytic reducer (SCR) positioned downstream of the turbine, and a compressor driven by the turbine comprising:
supplying compressed air from the compressor to the engine;

injecting a urea reductant into the SCR through a dosing injector to reduce NOx;

controlling temperature of said dosing injector to be within a predetermined range for conversion of said urea to ammonia by portioning an air flow across said dosing injector between a portion of said compressed air and another portion of ambient air; and adjusting engine torque to compensate for said portioning of said compressed air.

15. The method recited in claim 14 wherein said engine torque adjustment comprises adjusting exhaust flow across said turbine.

16. The method recited in claim 15 further comprising a wastegate coupled to the engine exhaust and positioned in parallel with the turbine and a wastegate valve controlling exhaust flow through said wastegate wherein said engine torque adjustment comprises adjusting said wastegate valve.

17. The method recited in claim 14 further comprising a heat exchanger positioned downstream of the compressor wherein said portion of said compressed air supplied across said dosing injector is supplied from upstream of said heat exchanger.

18. The method recited in claim 14 wherein said predetermined temperature range is between 150 to 170 degrees Centigrade.

19. The method recited in claim 14 wherein said ammonia reduces nitrogen oxide emissions in the SCR.

* * * * *